United States Patent
McEwan

(10) Patent No.: US 7,224,944 B2
(45) Date of Patent: May 29, 2007

(54) RF TRANSCEIVER HAVING A DIRECTLY RADIATING TRANSISTOR

(75) Inventor: Thomas E. McEwan, Las Vegas, NV (US)

(73) Assignee: McEwan Technologies, LLC, Las Vegas, NV (US)

( * ) Notice: Subject to any disclaimer, the term of this patent is extended or adjusted under 35 U.S.C. 154(b) by 569 days.

(21) Appl. No.: 10/763,888

(22) Filed: Jan. 22, 2004

(65) Prior Publication Data

US 2005/0164643 A1   Jul. 28, 2005

(51) Int. Cl.
    *H04B 1/40* (2006.01)
(52) U.S. Cl. .................. 455/86; 455/73; 455/523; 455/82; 342/21; 342/22
(58) Field of Classification Search ............ 455/86, 455/73, 523, 82; 342/21, 22
    See application file for complete search history.

(56) References Cited

U.S. PATENT DOCUMENTS

| 3,789,296 | A |  | 1/1974 | Caruso, Jr. et al. |
| 3,922,914 | A |  | 12/1975 | Fuchs |
| 4,322,832 | A |  | 3/1982 | Sartorius |
| 4,766,549 | A |  | 8/1988 | Schweitzer et al. |
| 5,438,867 | A |  | 8/1995 | van der Pol |
| 5,457,990 | A |  | 10/1995 | Oswald et al. |
| 5,609,059 | A |  | 3/1997 | McEwan |
| 5,610,611 | A |  | 3/1997 | McEwan |
| 5,767,953 | A |  | 6/1998 | McEwan |
| 5,969,666 | A |  | 10/1999 | Burger et al. |
| 5,986,600 | A | * | 11/1999 | McEwan ............... 342/28 |
| 6,137,438 | A |  | 10/2000 | McEwan |
| 6,191,724 | B1 | * | 2/2001 | McEwan ............... 342/21 |
| 6,198,424 | B1 |  | 3/2001 | Diede et al. |
| 6,300,897 | B1 |  | 10/2001 | Kielb |
| 6,445,192 | B1 |  | 9/2002 | Lovegren et al. |
| 6,452,467 | B1 |  | 9/2002 | McEwan |
| 6,531,977 | B2 |  | 3/2003 | McEwan |
| 6,586,999 | B2 | * | 7/2003 | Richley ............... 330/276 |
| 6,700,530 | B1 |  | 3/2004 | Nilsson |
| 6,972,712 | B1 |  | 12/2005 | Karlsson |

* cited by examiner

*Primary Examiner*—Sanh D. Phu

(57) ABSTRACT

Transistor package leads form quarter-wave antenna elements that directly radiate RF energy into free space without the need for a separate antenna. The transistor operates at a fundamental frequency and radiates a harmonic, thereby allowing radiation at frequencies normally considered "beyond cutoff" for a packaged transistor. This technique enables an additional 20 GHz of spectrum for use by surface mount technology. The transistor may be mounted on 1.6 mm thick glass-epoxy circuit board that also forms a quarter-wave reflector at 26 GHz. An optional dielectric lens produces a narrow beam and an optional planar filter rejects spurious fundamental emissions. A 26 GHz ultra-wideband (UWB) pulse-echo radar rangefinder implementation provides a low-cost upgrade to ultrasound.

17 Claims, 4 Drawing Sheets

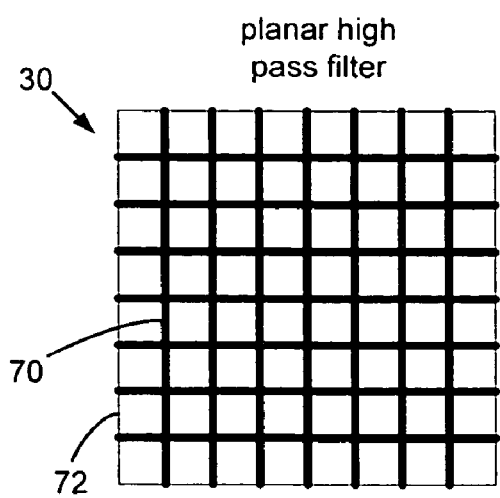
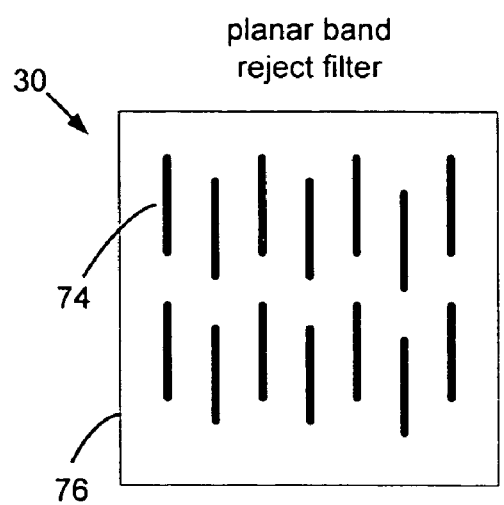
FIG. 3a
FIG. 3b

RF TRANSCEIVER HAVING A DIRECTLY RADIATING TRANSISTOR

BACKGROUND OF THE INVENTION

1. Field of the Invention

The present invention relates to microwave transceivers, and more particularly to microwave radar sensors, such as rangefinders and motion detectors.

2. Description of Related Art

Radio and radar transceivers operate at radio frequency (RF) wavelengths that are larger than the active devices used to generate the RF. Active devices, such as vacuum tubes and transistors, are considered to be "beyond cutoff" when subjected to frequencies having a wavelength approaching their physical dimensions or the dimensions of their connection leads. Operation at such short wavelengths is nearly impossible since a quarter-wavelength lead forms a transformer that inverts the impedance from low to high or vice-versa. In contrast, antennas need to be a significant fraction of a wavelength, such as a quarter-wavelength, for efficient radiation into free space.

Small inductors can radiate with limited effectiveness for applications such as automotive remote door-lock transmitters. For example, U.S. Pat. No. 4,307,465 to Geller describes an "inductance or coil" which "functions as the antenna." However, the coil is much smaller than the radiated wavelength and radiation efficiency is limited.

At microwave and millimeter-wave frequencies, small transmission line elements on a substrate or printed circuit board (PCB) function as quarter-wave radiating elements or as patch antennas. U.S. Pat. No. 6,366,245 to Schmidt and U.S. Pat. No. 6,107,955 to Wagner depict configurations for radiating from patch antennas coupled to dielectric lenses. These antennas are clearly separate from their active devices and their connecting leads.

As a drawback to these radiating devices, additional cost and complexity is incurred by utilizing antennas or coils to serve as the radiating devices. This also increases the size of the device and, due to inefficiencies or losses within such radiating devices or the conductive paths leading to such radiating devices, power consumption may be undesirably high.

SUMMARY OF THE INVENTION

A method and apparatus for radiating high frequency energy is disclosed herein that overcomes the drawbacks of the prior art. In general, a high frequency energy radiator is disclosed that generates a high frequency signal and utilizes interconnects or leads as the radiating elements.

In one embodiment, active devices that exhibit substantial gain at very high frequencies are utilized. Such devices may be limited by package parasitics such as inductance and wavelength effects on the package leads. For example, the data sheet for a pseudomorphic hetero-junction FET type NE3210S01 (or HJ FET herein) by California Eastern Laboratories shows 12 dB gain at 18 GHz. However, no data is provided beyond 18 GHz even though its frequency-gain curve can be extrapolated to 85 GHz at 0 dB gain. Package parasitics seriously limit operation beyond 18 GHz; the device is package-limited rather than transistor-limited. If operation with package-limited devices could be realized beyond 18 GHz, substantial new and cost-competitive applications could be realized in the 24 GHz ISM band, the new 22–29 GHz ultra-wideband (UWB) FCC allocation, and higher bands. The prior art does not teach how to employ package-limited devices in transceiver applications at frequencies beyond cutoff.

At sufficiently high frequencies, the length of transistor package leads become approximately one-quarter wave in length and act as efficient radiators of RF energy into free space, i.e., the package leads become antennas. As used herein, the term RF is defined to mean any frequency greater than 1 gigahertz. In certain embodiments the frequency range of operation is greater than 5 gigahertz while in other embodiments the frequency range of operation is greater than 20 gigahertz. Unfortunately, it is nearly impossible to operate a transistor at such high frequencies that its leads are one-quarter wave long, i.e. at package limited frequencies. Experiments by the applicant show that package lead parasitics limit the upper range of oscillation for a surface-mount packaged HJ FET to about 20 GHz. To overcome this limitation and operate above 20 GHz, a harmonic oscillator may be employed. In an exemplary transceiver, an oscillator is configured to oscillate at a fundamental frequency of 13 GHz with a conduction angle that promotes second harmonic generation at 26 GHz—well beyond the conventional cutoff frequency of the package. The harmonics are generated on the transistor die, which is connected directly to the package leads. At 26 GHz, the package leads approximate a quarter-wavelength and efficiently radiate into free space. "Transistor" is commonly defined as the transistor die and the package in combination. However, depending on the application, it may simply refer to the die or any other signal generation device.

The transistor may be mounted on an industry standard, low-cost 1.6 mm thick glass-epoxy printed circuit board (PCB) substrate, or any other arrangement. If the PCB is metallized on the backside, a quarter-wave reflector is formed to enhance radiation perpendicular to the PCB. An optional feature is a dielectric lens that can be utilized for narrow beamforming. Yet another optional feature is a planar filter that can be located above the PCB to block spurious radiation of a fundamental frequency.

The apparatus may further comprise a receiver function such as a harmonic detector or a sampler to form a transmitter-receiver, or transceiver. While the initial use of the transceiver relates to radar sensors, it may also be used as a radio transceiver or, as a stand-alone transmitter or receiver.

Radar applications for the transceiver include low-cost short-range motion detectors and rangefinders. In one rangefinder mode, a short sinusoidal RF burst is transmitted to a target by an oscillator in the transceiver. Shortly after transmission, the transceiver employs the same RF oscillator to produce a local oscillator pulse (homodyne operation), which gates a sample-hold circuit in the receiver to produce a voltage sample from a target echo. This process is repeated at several megaHertz. With each successive repetition, another sample may be taken and integrated with the previous sample to reduce the noise level. Also, each successive local oscillator pulse is delayed slightly from the previous pulse such that after about 10 milliseconds, the successive delay increments add up to a complete sweep of perhaps 67-nanoseconds, or about 10 meters in range. After each sweep, the local oscillator delay may be reset to a minimum and the next sweep begins. A radar sensor employing this technique is fully described in U.S. Pat. No. 6,414,627 to McEwan.

In one embodiment, a system based on the teachings contained herein may be configured to provide millimeter-wave and near millimeter-wave radar sensors using low-cost packaged transistors.

BRIEF DESCRIPTION OF THE DRAWINGS

FIG. 3a depicts a planar high pass filter of an example embodiment of the present invention.

FIG. 3b depicts a planar band reject filter of an example embodiment of the present invention.

DETAILED DESCRIPTION OF THE INVENTION

A detailed description of the present invention is provided below with reference to the figures. While illustrative component values and circuit configurations are given, other embodiments can be constructed with other component values and circuit configurations. All U.S. patents cited herein are herein incorporated by reference.

Figure 1:
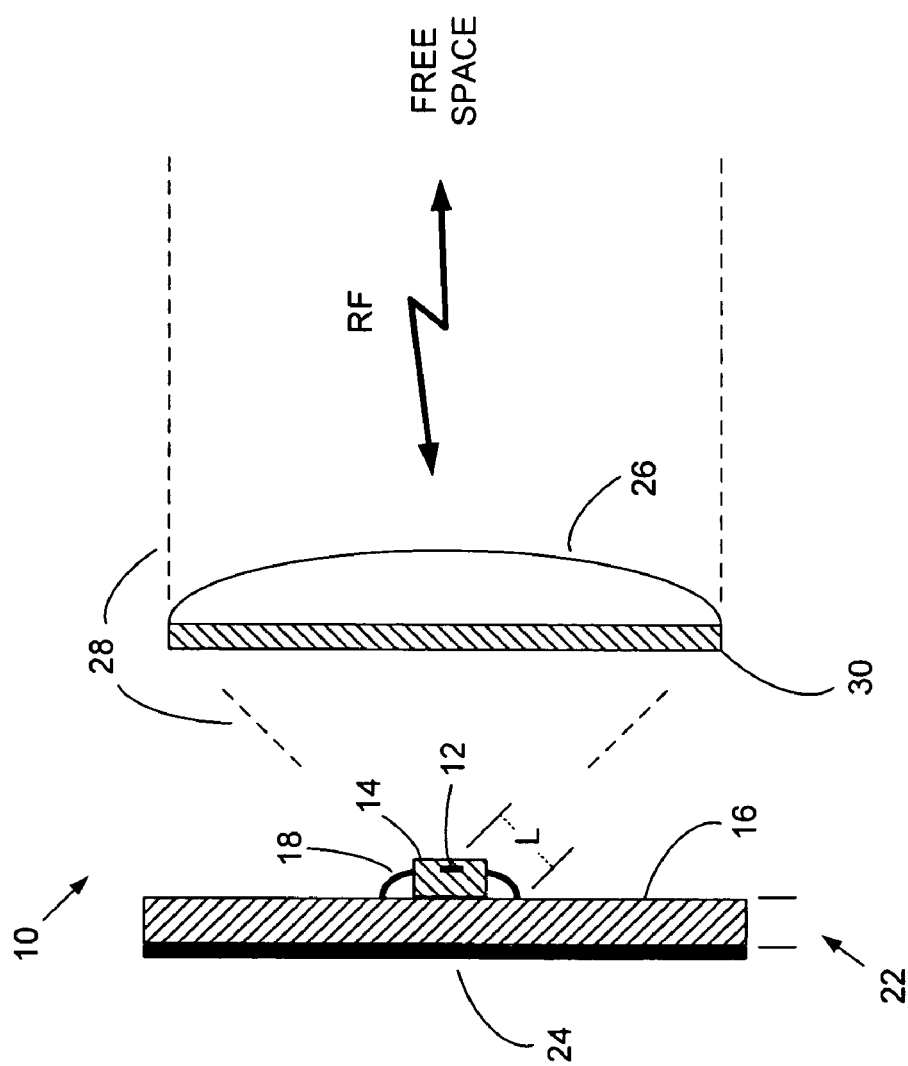
FIG. 1 is a side view of a physical layout for a transceiver of an example embodiment of the present invention.

FIG. 1 is a block diagram of a microwave transceiver 10 of the present invention. Although shown as a transceiver, it is contemplated that the transceiver may comprise a device configured to perform only a transmit function, receive function, or both. A transistor die 12 is enclosed in package 14 and connected to substrate 16 via lead 18. The embodiments shown herein refer primarily to a transistor or transistor die, however, it is contemplated that in devices, circuits or systems other than a transistor may be utilized. Thus, the claims that follow should not be limited to a transistor or transistor die. Reference to lead 18 generally refers to all leads connected to transistor 12, and the lengths of all leads to transistor 12 are approximately equal. In the event of asymmetric lead lengths, it is assumed that at least one lead is sufficiently long to efficiently radiate. The length of the leads from the die to the substrate is identified with reference L. In one embodiment the length L of lead 18 is ideally a quarter-wavelength at the frequency to be radiated. Other lead lengths will work for efficient radiation, provided they are a substantial fraction of a wavelength, i.e., greater than 0.1 wavelength long. A length of less than 0.1 wavelength is an inefficient radiator, although in certain applications such a length may be utilized. In some cases, the ideal length of one quarter-wavelength must be altered to account for loading effects at the lead ends. At an exemplary frequency of 26 GHz, the leads for a standard 2 mm diameter surface mount package work well as radiators, although other lengths may be utilized.

In an exemplary embodiment, substrate 16 is fabricated of standard glass-epoxy PCB (printed circuit board) material. Substrate thickness 22 may be a thickness of 1.6 mm, which is one quarter-wave thick at 26 GHz after accounting for the PCB dielectric constant. This thickness is particularly desirable at this frequency because it is quarter-wave reflector. Applicant submits that it is novel to utilize a PCB as a reflector and as such the prior art does not teach use of a printed circuit board as a reflector. This provides the advantage of a low cost, device for use as a reflector which, in the embodiments described herein, is also used as the circuit board. The use of the PCB also provides a large surface area that is not satisfied by the reflective capabilities of a patch antenna, which are small, expensive, and performs inadequately as a reflector. In other embodiments, other thicknesses or configuration of PCB may be utilized to serve as the reflector. Copper metallization 24, or other reflective substance, on the backside, in combination with the PCB dielectric material (glass-epoxy), may be utilized to form a quarter-wave reflector to further enhance radiation from leads 18.

RF radiation from leads 18 emanates perpendicular to the PCB in a wide beam. Optional dielectric lens 26 may be added to increase gain and decrease beamwidth. Microwave dielectric lenses are well known in the art and will not be discussed herein.

In an exemplary embodiment, transistor die 12 oscillates at a fundamental frequency of 13 GHz and radiates a second harmonic at 26 GHz, which is in the FCC's newly allocated UWB band. However, some 13 GHz energy radiates from the PCB and it may be desirable to attenuate this spurious component even if it is below FCC limits, either to minimize RF pollution or to reduce spurious sensor responses. Optional planar filter 30 may be added to reject the 13 GHz component.

Figure 2:
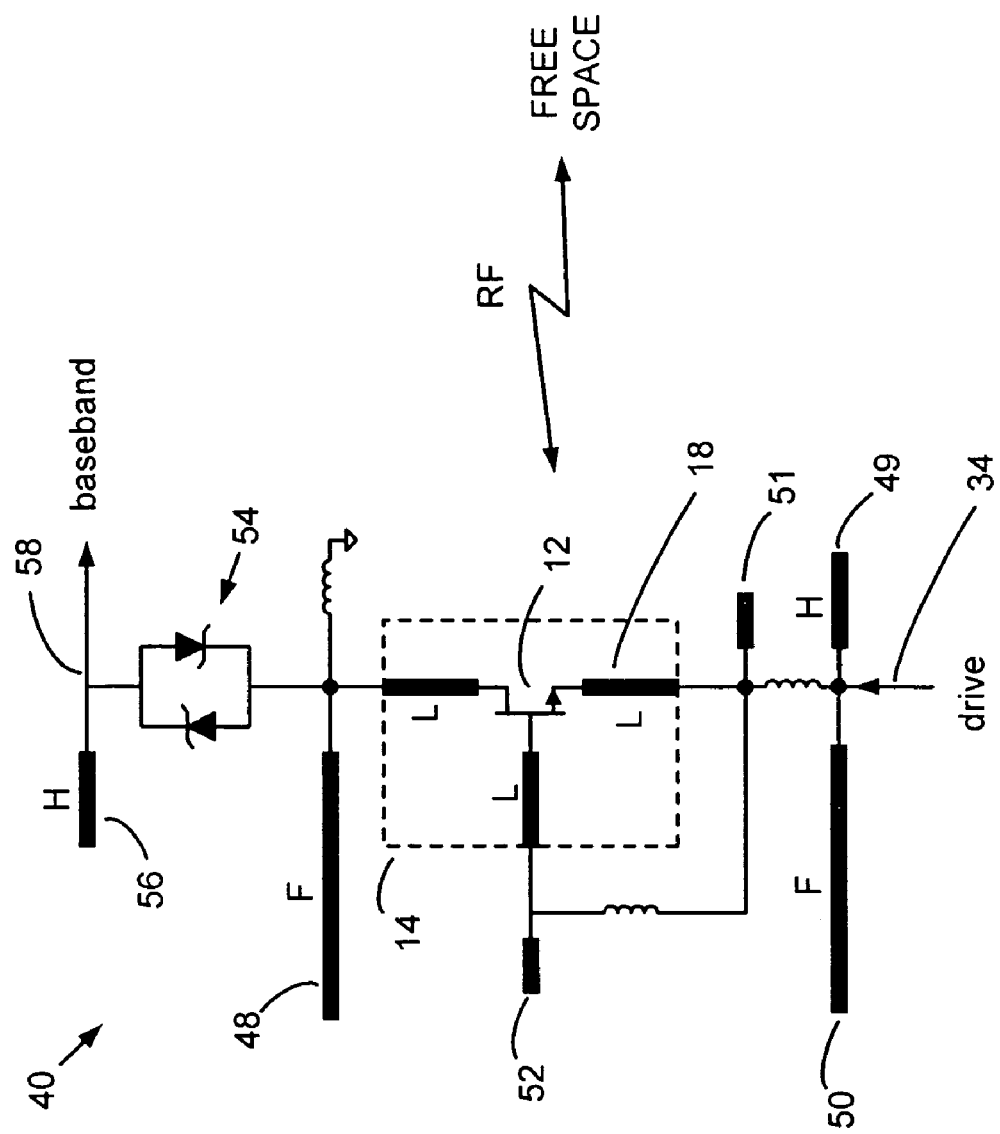
FIG. 2 is a schematic diagram of an RF transistor and detector for a transceiver of an example embodiment of the present invention.

FIG. 2 is a detailed schematic of an exemplary transceiver circuit 40 of an example embodiment of the present invention. In this example embodiment transistor 12 is configured as a harmonic oscillator and is connected to surrounding circuitry via three leads 18 of length L, as part of package 14. L is typically one quarter-wavelength long at the radiated frequency, but may assume other lengths. Microstrip 48 is one quarter-wavelength long at 13 GHz for a 26 GHz second harmonic system, but may assume other lengths. It serves to tune the fundamental frequency and to reduce fundamental coupling to diodes 54.

A transistor drive signal is provided on line 34 to bias on transistor 12. The drive can be a continuous current for CW Doppler sensing, or short pulses for range gated Doppler sensing, as described in U.S. Pat. No. 5,966,090 to McEwan. For rangefinding, the drive signal may comprise a first, or transmit, pulse followed by a second, or receive, pulse that is swept in delay to serve as a local oscillator pulse in an equivalent time system. This two pulse operation is fully described in the above-cited '627 patent. In other embodiments, other drive signals may be utilized. Microstrips 49, 50 block RF from coupling back into the drive circuit at the fundamental frequency F and harmonic frequency H. Microstrips 51, 52 of lengths α, β respectively are fine trims to adjust the conduction angle of oscillator transistor 12 for maximum harmonic output. In some cases they may be omitted. Microstrips 48–52 and 56 reside on the surface of PCB 16, or may be equivalents as known in the art.

Back-to-back diodes 54 form a harmonic sampler. Diodes 54 receive free-space RF that is coupled from the leads of transistor 12 and they may also receive RF directly from their own leads and interconnects. The back-to-back connection of diodes 54 results in conduction on each half cycle of the 13 GHz oscillation provided by oscillator 12. The net effect is the same as a single diode conducting on every full cycle of a 26 GHz local oscillator. Experiments show that this frequency doubling harmonic sampler has nearly the same sensitivity as a non-harmonic 26 GHz local oscillator and sampler. In addition to harmonic sampling, a key advantage to the back-to-back diode connection is rejection of local oscillator noise, since the back-to-back connection develops zero offset bias (in principle) at its output, and consequently there can be little output noise due to the local oscillator. Of course, a single diode may be used at the expense of oscillator noise rejection. Microstrip 56 provides an RF short at the operating frequency of diodes 54. Diodes 54 also form a harmonic detector for CW operation. The output from diodes 54 is provided on line 58 as a baseband or video signal, which may be coupled to preamps, bandpass amps, variable gain stages, pulse detectors, digital processors and other receiver and processing functions known in the art.

In an alternative embodiment, the transistor 12 may operate as a fundamental mode oscillator rather than a harmonic oscillator. A fundamental mode oscillator has higher output amplitude but is far more difficult to implement in surface mount technology (SMT) due to lead parasitics. Above 20 GHz, fundamental mode oscillation is possible by violating SMT assembly rules when using transistor packages available at present. Obviously, integrating the transceiver circuitry onto a single chip or hybrid circuit substrate, including an antenna that is separate from the active device, would allow fundamental mode operation and neatly allow all RF functions to reside in one package. However, it is doubtful that the integrated approach will ever be cost competitive to a single discrete RF transistor on an inexpensive glass-epoxy PCB. Thus, the surface mount transceiver of FIG. 1 should remain cost competitive far into the future.

The transistor 12 may be a pseudomorphic hetero-junction FET type NE3210S01 by California Eastern Laboratories, and diodes 54 may be obtained in a single package of type BAT 15014W by Infinion. Of course, these are exemplary devices and the claims that follow are not limited to these devices.

FIG. 3a shows a planar filter 30 comprised of a metallized grid 70 on PCB 72. The grid spacing is such that long waves will not fit, i.e. pass through the grid, whereas shorter waves will fit and pass un-attenuated. Thus, the grid serves as a high pass filter that passes 26 GHz harmonics while rejecting 13 GHz spurious fundamental components in an exemplary system.

FIG. 3b shows an alternative planar filter 30 comprised of a metallized dipole array 74 on PCB 76. Each dipole is one-half wavelength long at the frequency of maximum rejection. Thus, the grid serves as a rejection filter that passes 26 GHz harmonics while rejecting 13 GHz spurious fundamental components in an exemplary system. Other planar filter designs are known in the art.

Figure 4A:
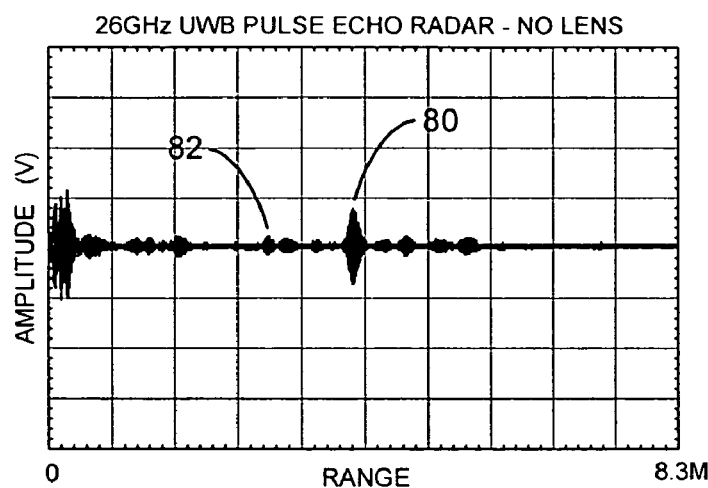
FIGS. 4a–c plot the responses of a rangefinder employing a transceiver of an example embodiment of the present invention.
Figure 4B:
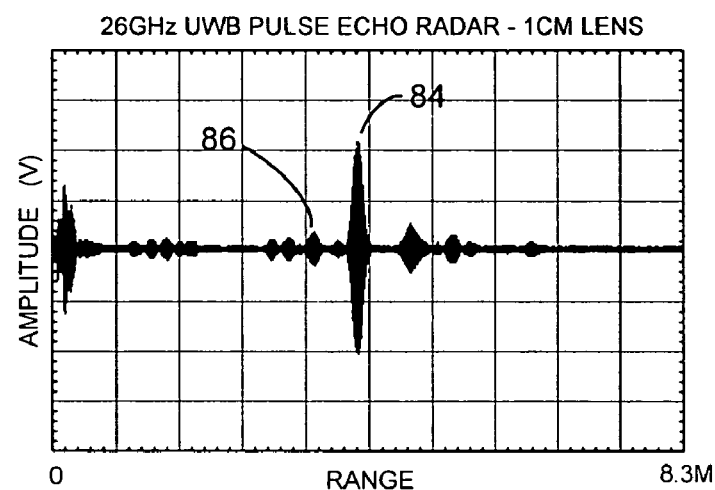
Figure 4C:
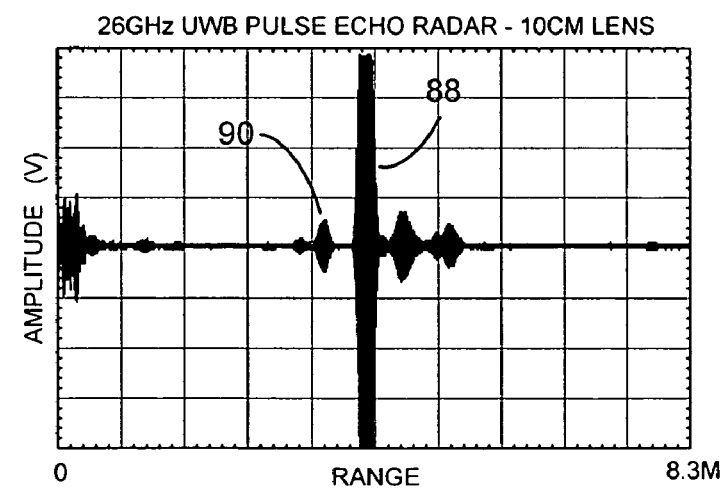

FIGS. 4a–c illustrate plots of hardware bench test data for a 26 GHz UWB rangefinder using transceiver 10 along with timing and receiver circuitry as described in the above-cited '627 patent. The target range is 4 meters. FIG. 4a plots the target return 80 and room clutter 82 for transceiver 10 without a dielectric lens. FIG. 4b plots the target return 84 and room clutter 86 for transceiver 10 with a 1 cm diameter dielectric lens. FIG. 4c plots a very strong, saturated target return 88 and room clutter 90 for transceiver 10 with a 10 cm diameter dielectric lens.

Although the invention has been described with reference to an exemplary 26 GHz system in view of the high interest in this frequency, the principles of the invention can be applied to other frequencies, e.g., 10.5 GHz and 38 GHz. The techniques using harmonic transmit pulses and harmonic sampling can be similarly applied. The transistor 12 may serve other functions besides an RF oscillator, such as an RF amplifier or RF detector. Lead(s) 18 of FIG. 1 may also be wire bonds connected to bare die without package 14. The package 14 is an exemplary component feature in surface mount embodiments of the transceiver.

Although certain implementations are shown herein, it is contemplated that the method and apparatus disclosed herein may be utilized in numerous environments. For example, applications for the new apparatus are widespread and universal. They include, but are not limited to, non-contact rangefinders for robotics, automotive safety devices, such as backup warning radar, home improvement, such as electronic room measurement devices, tank fill-level sensing, aids-to-the-blind, industrial automation, such as mechanical position control, aircraft altimeters, and boat docking radar. The new apparatus may also be used in 3-D radar imaging for industrial inspection, for through-clothing security screening at airports, for digitizing objects in computer aided design, and for tracking objects in virtual reality applications including computer generated images for Hollywood movie-making. The new apparatus may also be used in innumerable motion sensing applications using its Doppler sensing mode, such as home and automotive security sensors, automatic door openers, police and sports radar speed sensors, vehicle ground speed sensors, wake-up devices in vending machines and toys, and various military applications.

Changes and modifications in the specifically described embodiments can be carried out without departing from the scope of the invention, which is intended to be limited only by the scope of the appended claims.

What is claimed is:

1. An RF transceiver comprising:
    one or more transistors configured to generate an RF signal, wherein the RF signal has a signal wavelength;
    a substrate; and
    one or more leads, at least one of which has a length that is 0.1 times the signal wavelength, connecting the one or more transistors to the substrate, wherein at least one of the one or more leads radiates RF energy into, or receives energy from, free space such that at least one of the one or more leads serve as the antenna or radiator for the transceiver.

2. The apparatus of claim 1 wherein the one or more transistors are enclosed in a package and the substrate comprises a first side and a second side and at least one side of the substrate is metalized.

3. The apparatus of claim 1 wherein at least one transistor is operated as an oscillator.

4. The apparatus of claim 3 wherein at least one transistor is operated as a harmonic oscillator.

5. The apparatus of claim 1 wherein the substrate is a quarter-wavelength thick.

6. The apparatus of claim 1 further comprising a dielectric lens positioned between the one or more leads and free space.

7. The apparatus of claim 1 further comprising a detector coupled to at least one transistor.

8. The apparatus of claim 1 further comprising a planar filter positioned between the one or more leads and free space to filter the RF signal.

9. The apparatus of claim 8 wherein the planar filter is a high pass filter comprised of a metallized hatch pattern.

10. The apparatus of claim 8 wherein the planar filter is a rejection filter comprised of ½-wave metallized strips at the rejection frequency.

11. A method of radiating RF energy utilizing leads from one or more transistors as the radiating elements or antennas, the method comprising:
    generating an RF signal with one or more RF transistors, the one or more RF transistors located on a substrate; and
    outputting the RF signal through one or more leads, wherein the one or more leads are configured to connect the one or more transistors to the substrate and the leads are configured to radiate the RF energy to free space.

12. The method of claim 11, further comprising focusing the RF energy radiated from the one or more leads through one or more lenses.

13. A method of radiating or receiving RF energy, wherein the RF energy is generated by a signal having an operating frequency and the operating frequency defining a corresponding wavelength, comprising:
providing a substrate having a first side, a second side, and having a thickness that is one-quarter of the wavelength;
metallizing the first side of the substrate to form a quarter-wave reflector;
positioning one or more RF transistors on the second side of the substrate; and
radiating RF energy from, or receiving RF energy with, the one or more transistors at the operating frequency using gain provided by the quarter-wave reflector.

14. The method of claim 13, further comprising providing a lens generally parallel to the second side of the substrate, the lens configured to increase gain or narrow the RF energy.

15. A method of radiating or receiving RF energy, comprising:
positioning an RF transistor on a substrate;
radiating RF energy from the transistor towards free-space; and
positioning a planar filter between the RF transistor and free space to filter a component of the radiated RF energy.

16. A method of radiating RF energy, comprising:
positioning an RF transistor on a substrate of thickness T, wherein the substrate has a front side and a back side, with the transistor on the front side;
positioning a metallic reflecting surface on the backside of the substrate;
operating the transistor at a frequency having a quarter wavelength equal to T;
radiating RF energy from the transistor to the backside through the substrate; and
reflecting the RF energy from the metallic reflecting surface back through the substrate and out into free space.

17. The method of claim 16 wherein operating the transistor further comprises operating the transistor as a harmonic oscillator with a harmonic having a quarter-wavelength equal to T.

* * * * *